US009965626B2

(12) United States Patent
Margalit et al.

(10) Patent No.: US 9,965,626 B2
(45) Date of Patent: May 8, 2018

(54) MEMORY ATTACK DETECTION

(71) Applicant: EMPIRE TECHNOLOGY DEVELOPMENT LLC, Wilmington, DE (US)

(72) Inventors: Mordehai Margalit, Zichron Yaaqov (IL); Shmuel Ur, Galil (IL); David Hirshberg, Haifa (IL); Shimon Gruper, Haifa (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

(21) Appl. No.: 14/370,399

(22) PCT Filed: Jul. 18, 2013

(86) PCT No.: PCT/US2013/051100
§ 371 (c)(1),
(2) Date: Jul. 2, 2014

(87) PCT Pub. No.: WO2015/009306
PCT Pub. Date: Jan. 22, 2015

(65) Prior Publication Data
US 2015/0161388 A1    Jun. 11, 2015

(51) Int. Cl.
*G06F 21/55* (2013.01)
*G06F 21/74* (2013.01)
(Continued)

(52) U.S. Cl.
CPC ........ *G06F 21/554* (2013.01); *G06F 12/1425* (2013.01); *G06F 21/74* (2013.01); *G06F 21/79* (2013.01)

(58) Field of Classification Search
CPC .. G06F 12/1425; G06F 12/1433; G06F 21/70; G06F 21/74; G06F 21/78;
(Continued)

(56) References Cited

U.S. PATENT DOCUMENTS 5,475,498 A * 12/1995 Radice ............. G11B 20/10527
                                                        360/32
5,652,883 A *  7/1997 Adcock ............... G06F 12/0253
(Continued)

FOREIGN PATENT DOCUMENTS

KR    1020040098902 A    11/2004
WO       2009139170 A1    11/2009

OTHER PUBLICATIONS

Waksman et al. "Tamper Evident Microprocessors", May 16, 2010.*
(Continued)

*Primary Examiner* — John B King
*Assistant Examiner* — Arya Golriz
(74) *Attorney, Agent, or Firm* — Moritt Hock & Hamroff LLP; Steven S. Rubin, Esq.

(57) ABSTRACT

Technologies are generally described for systems, devices and methods effective to detect a potential attack on a memory of a memory device. In some examples, a processor may send a request to the memory device. The request may include a request for information that relates to memory writes to the memory of the memory device. The processor may receive a response from the memory device. The response may include the information that relates to the memory writes. The processor may determine, based on the response, an amount of memory of the memory device written to during an interval of time. The processor may detect the potential attack based on the amount of memory
(Continued)

written to and based on the interval of time. The processor may then generate an alert based on the detection of the potential attack.

20 Claims, 8 Drawing Sheets

(51) Int. Cl.
*G06F 12/14* (2006.01)
*G06F 21/79* (2013.01)

(58) Field of Classification Search
CPC ..... G06F 2221/2149; G06F 2221/2101; G06F 2221/2105; G06F 2221/2141
See application file for complete search history.

(56) References Cited

U.S. PATENT DOCUMENTS

| | | | |
|---|---|---|---|
| 2005/0235131 A1* | 10/2005 | Ware | G06F 12/0292 711/203 |
| 2006/0011816 A1 | 1/2006 | Garbe et al. | |
| 2007/0078915 A1 | 4/2007 | Gassoway | |
| 2007/0157315 A1 | 7/2007 | Moran | |
| 2008/0104368 A1 | 5/2008 | Hasegawa | |
| 2008/0180252 A1 | 7/2008 | Vogt | |
| 2009/0070748 A1 | 3/2009 | Lin et al. | |
| 2009/0106563 A1* | 4/2009 | Cherpantier | G06F 21/86 713/194 |
| 2009/0132852 A1 | 5/2009 | Sekiya | |
| 2009/0276565 A1* | 11/2009 | Fujibayashi | G06F 3/0613 711/112 |
| 2010/0070683 A1 | 3/2010 | Kelley et al. | |
| 2011/0066896 A1 | 3/2011 | Ebina et al. | |
| 2011/0286599 A1 | 11/2011 | Tuyls et al. | |
| 2012/0144486 A1* | 6/2012 | Navaraj | G06F 21/52 726/23 |
| 2012/0255031 A1 | 10/2012 | Sallam | |
| 2014/0281127 A1* | 9/2014 | Marcu | G06F 12/0246 711/103 |

OTHER PUBLICATIONS

"Prototype: Flash_Destroyer," accessed at http://dangerousprototypes.com/2010/05/25/prototype-flash_destroyer/, May 25, 2010, pp. 1-18.

"Stuxnet," Wikipedia, accessed at http://en.wikipedia.org/wiki/Stuxnet, Last modified on Jun. 20, 2013, pp. 1-16.

"USB Flash Drive speed Tests—Any Drive Size," accessed at http://usbspeed.nirsoft.net/, accessed on Jun. 30, 2014, pp. 1-28.

International Search Report and Written Opinion for International Application No. PCT/US13/51100, dated Apr. 22, 2014, 8 pages.

Kotler, I., "Let Me Stuxnet You," Security Art, Security Art Ltd., 2011, pp. 1-37.

Tuck, et. al., "Deterministic Memory-Efficient String Matching Algorithms for Intrusion Detection," Twenty-third Annual Joint Conference of the IEEE Computer and Communications Societies, 2004, pp. 2628-2639, vol. 4.

* cited by examiner

MEMORY ATTACK DETECTION

CROSS-REFERENCE TO RELATED APPLICATION

This application is a U.S. National Stage filing under 35 U.S.C. § 371 of International Application No. PCT/US13/51100, filed on Jul. 18, 2013, the entirety of which is hereby incorporated by reference.

BACKGROUND

Unless otherwise indicated herein, the materials described in this section are not prior art to the claims in this application and are not admitted to be prior art by inclusion in this section.

Devices may typically include processors and memory. The memory can include a memory controller. The controller may keep track of a number of writes to, and reads from, the memory. Memory may include flash memory. Flash memory may have a finite number of reading or writing cycles before the memory is destroyed.

SUMMARY

In one example, methods for detecting potential attacks on a memory of a memory device are generally described. The methods may include sending, by a processor, a request to the memory device. The request may include a request for information that relates to memory writes to the memory of the memory device. The methods may further include receiving, by the processor, a response from the memory device. The response may include the information that relates to the memory writes. The methods may further include determining, by the processor and based on the response, an amount of memory of the memory device written to during an interval of time. The methods may further include detecting, by the processor, the potential attack based on the amount of memory written to and based on the interval of time. The methods may further include generating, by the processor, an alert based on the detection of the potential attack.

In one example, devices are generally described. Devices may include a memory device and a processor. The memory device may include a memory and a memory controller. The processor may be configured to be in communication with the memory. The processor may be effective to send a request to the memory device. The request may include a request for information that relates to memory writes to the memory of the memory device. The processor may be further effective to receive a response from the memory device. The response may include the information that relates to the memory writes. The processor may be further effective to determine, based on the response, an amount of memory of the memory device written to during an interval of time. The processor may be further effective to detect a potential attack based on the amount of memory written to and based on the interval of time. The processor may be further effective to generate an alert based on the detection of the potential attack.

In one example, methods for detecting potential attacks on a memory of a memory device are generally described. The methods may include sending, by a processor, a request to the memory device. The request may include a request for information that relates to memory writes to the memory and reads of the memory of the memory device. The methods may further include receiving, by the processor, a response from the memory device. The response may include the information that relates to the memory writes and the memory reads. The methods may further include detecting, by the processor and based on the response, the potential attack based on a number of memory reads and based on a number of memory writes. The methods may further include generating, by the processor, an alert based on the detection.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
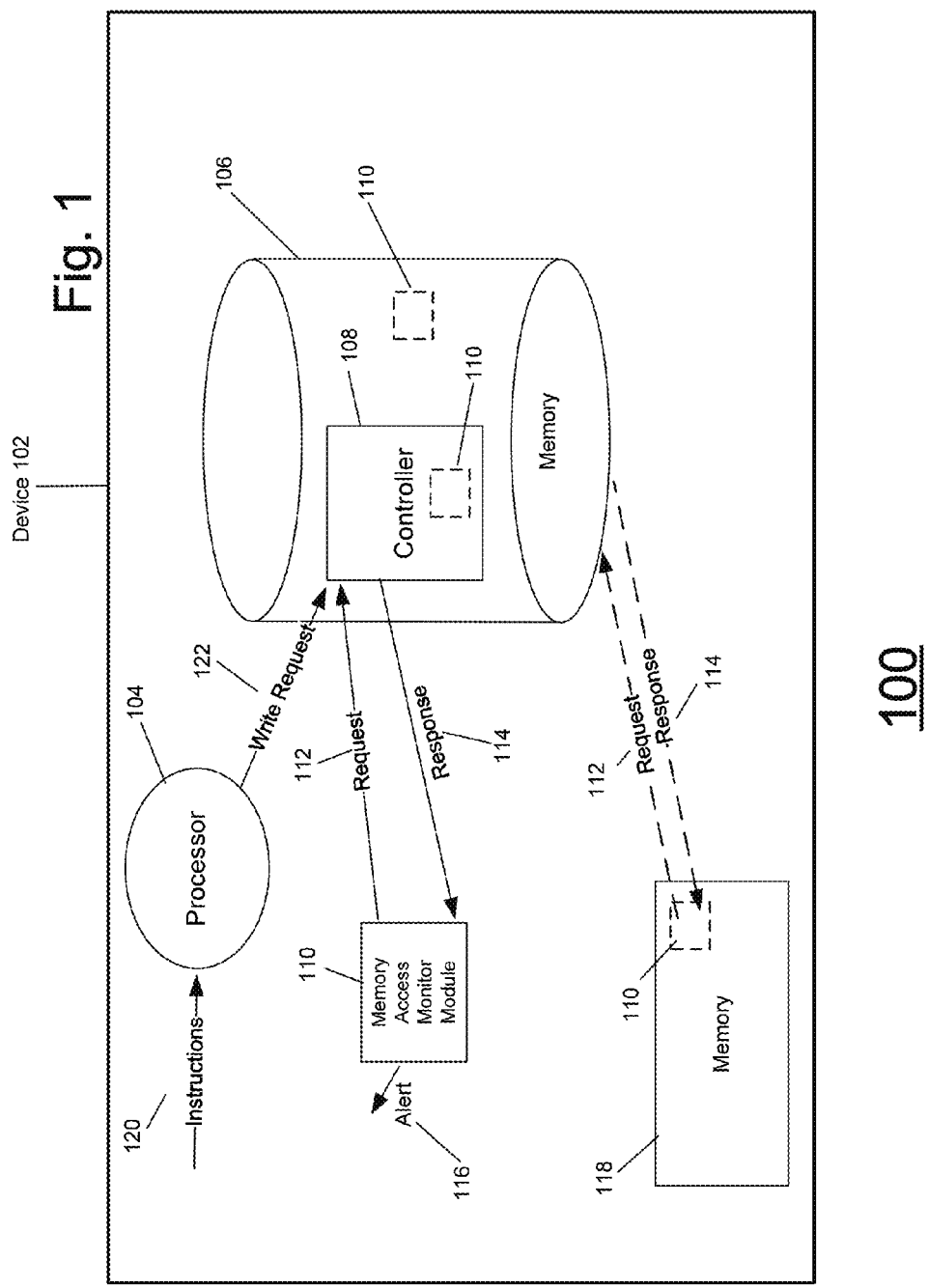
FIG. 1 illustrates an example system that can be utilized to implement memory attack detection.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to memory attack detection.

Briefly stated, technologies are generally described for systems, devices and methods effective to detect a potential attack on a memory of a memory device. In some examples, a processor may send a request to the memory device. The request may include a request for information that relates to memory writes to the memory of the memory device. The processor may receive a response from the memory device. The response may include the information that relates to the memory writes. The processor may determine, based on the response, an amount of memory of the memory device written to during an interval of time. The processor may detect the potential attack based on the amount of memory written to and based on the interval of time. The processor may then generate an alert based on the detection of the potential attack.

FIG. 1 illustrates an example system that can be utilized to implement memory attack detection, arranged in accordance with at least some embodiments described herein. As depicted, an example system 100 may include a device 102. Device 102 may include a processor 104, a first memory 106, a second memory 118, and/or a memory access monitor module 110 all configured to be in communication with each other. Memory access monitor module 110 may be implemented in software and executed by a processor, as a piece of hardware, or a combination of hardware and software. First memory 106 may be, for example, a memory device such as a flash memory and may include a controller 108. Controller 108 may control reading and/or writing to first memory 106. Controller 108 may maintain data relating to writes to and/or reads of first memory 106.

An operating system of device 102 may be stored in second memory 118. In examples where memory access monitor module 110 is implemented in software, memory access monitor module 110 may be instantiated within the operating system of device 102—as illustrated by dotted lines in second memory 118. Memory access monitor module 110 may also be instantiated in one or more of first memory 106 (as shown by dotted lines), in controller 108 (as shown by dotted lines), an application being executed by device 102 and/or in another location associated with device 102. Processor 104 may be configured to process one or more instructions 120. Processor 104 may execute instructions 120 to send a write request 122 to controller 108 to write to a data block of first memory 106. Write request 122 may include a request to store a value within a data block of first memory 106.

As will be explained in more detail below, memory access monitor module 110 may detect attacks on first memory 106. Memory access monitor module 110 may send a request 112 to controller 108. Request 112 may include a request for information related to memory writes to first memory 106. In response to request 112, controller 108 may generate a response 114. Memory access monitor module 110 may receive response 114. Response 114 may include information related to the memory writes to first memory 106. Based on response 114, memory access monitor module 110 may determine an amount of first memory 106 written to during an interval of time. Memory access monitor module 110 may detect a potential memory attack based on the amount of memory written to and based on the interval of time. Memory access monitor module 110 may also identify an application that corresponds to a number of memory writes. If memory access monitor module 110 detects a potential memory attack, memory access monitor module 110 may generate an alert 116. Alert 116 may include a warning that a potential memory attack is being performed on first memory 106. Alert 116 may include one or more actions that may be implemented to stop one or more potential memory attacks on first memory 106.

Figure 2:
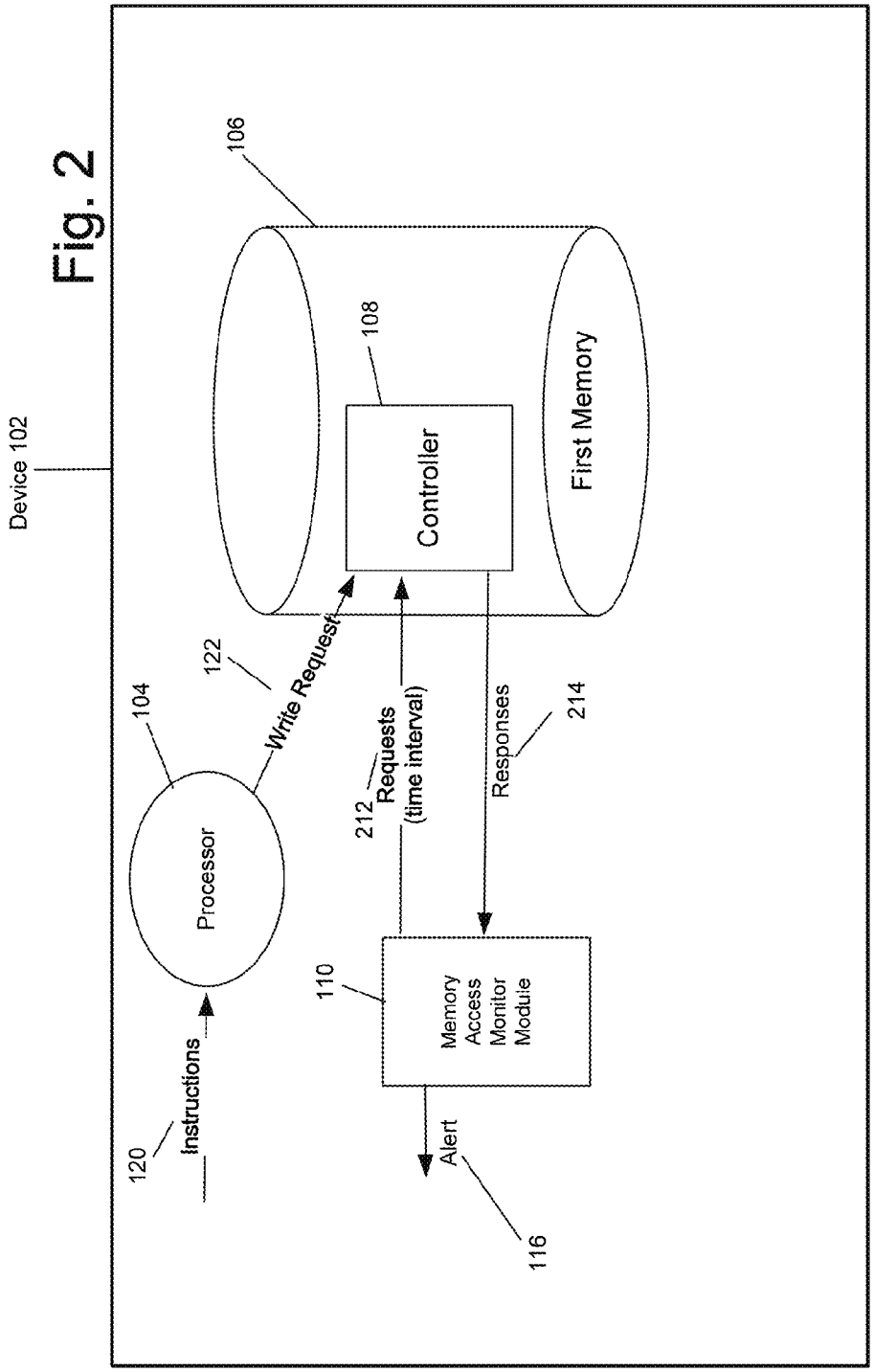
FIG. 2 illustrates the example system of FIG. 1 illustrating additional details relating to periodic time requests.

FIG. 2 illustrates example system 100 illustrating additional details relating to periodic time requests, arranged in accordance with at least some embodiments described herein. System 100 depicted in FIG. 2 is substantially similar to system 100 of FIG. 1, with additional details. Those components in FIG. 2 that are labeled identically to components of FIG. 1 will not be described again for the purposes of clarity.

Processor 104 may execute instructions 120 to send one or more write requests 122 to controller 108 to perform memory writes to first memory 106. Instructions 120 may be associated with one or more programs or applications. In an example, write requests 122 may seek to continuously store a value or values in a particular data block in first memory 106. Controller 108 may allow write requests 122 to continuously store the values in the particular data block in first memory 106. For example, instructions 120 may direct processor 104 to continually write successively higher integer values to a particular data block. After a certain number of memory writes to first memory 106, the particular data block, and eventually first memory 106 (which may be a flash memory), may be destroyed. In such a destruction, the particular data block under attack may no longer be able to store information.

To prevent such a memory attack on first memory 106, memory access monitor module 110 may send request 212 to controller 108. Request 212 may be sent at periodic time intervals. Memory access monitor module 110 may determine a particular interval of time at which to send request 212. Example intervals may be every hour or every day. Request 212 may be a request that relates to memory writes to first memory 106.

In an example, memory access monitor module 110 may be configured to send request 212 every hour on the hour. Controller 108 may generate responses 214 and send responses 214 to memory access monitor module 110. Responses 214 may include an amount of data written to first memory 106 at the time of request 212. Memory access monitor module 110 may receive responses 214. Memory access monitor module 110 may determine a difference between the amount of information stored in first memory 106 identified in response 214 and an amount of information stored in first memory 106 identified in a prior response. If the difference exceeds a predetermined threshold value, memory access monitor module 110 may generate alert 116. Threshold values may be based on a program or application accessing first memory 106. For example, an application that writes a larger amount of data to first memory 106 over a specified time span may have a proportionately higher threshold value as compared to an application that writes a smaller amount of data to first memory 106 over the specified time span.

In an example, memory access monitor module 110 may send request 212 at 1:00 PM. In response to request 212, controller 108 may send response 214 to memory access monitor module 110. Response 214 may indicate that 127,000 MB of information has been written to first memory 106 at the time of request 212. Memory access monitor module 110 may determine that 126,862 MB of information had been written to first memory 106 in the prior response, sent one hour earlier. Memory access monitor module 110 may subtract the amount of information of the prior response from the amount of information of response 214 to generate a difference value. In the current example, the difference is equal to: 127,000 MB−126,862 MB=138 MB. Memory access monitor module 110 may compare this difference value to the threshold value for memory writes within a 1 hour time span. In the example, the threshold value for memory writes within a 1 hour time span may be 100 MB. As the difference value of 138 MB exceeds the threshold value of 100 MB, memory access monitor 110 may generate alert 116. If the difference value does not exceed the threshold value, device 102 may continue to operate as normal until the next request 212 is generated.

Figure 3:
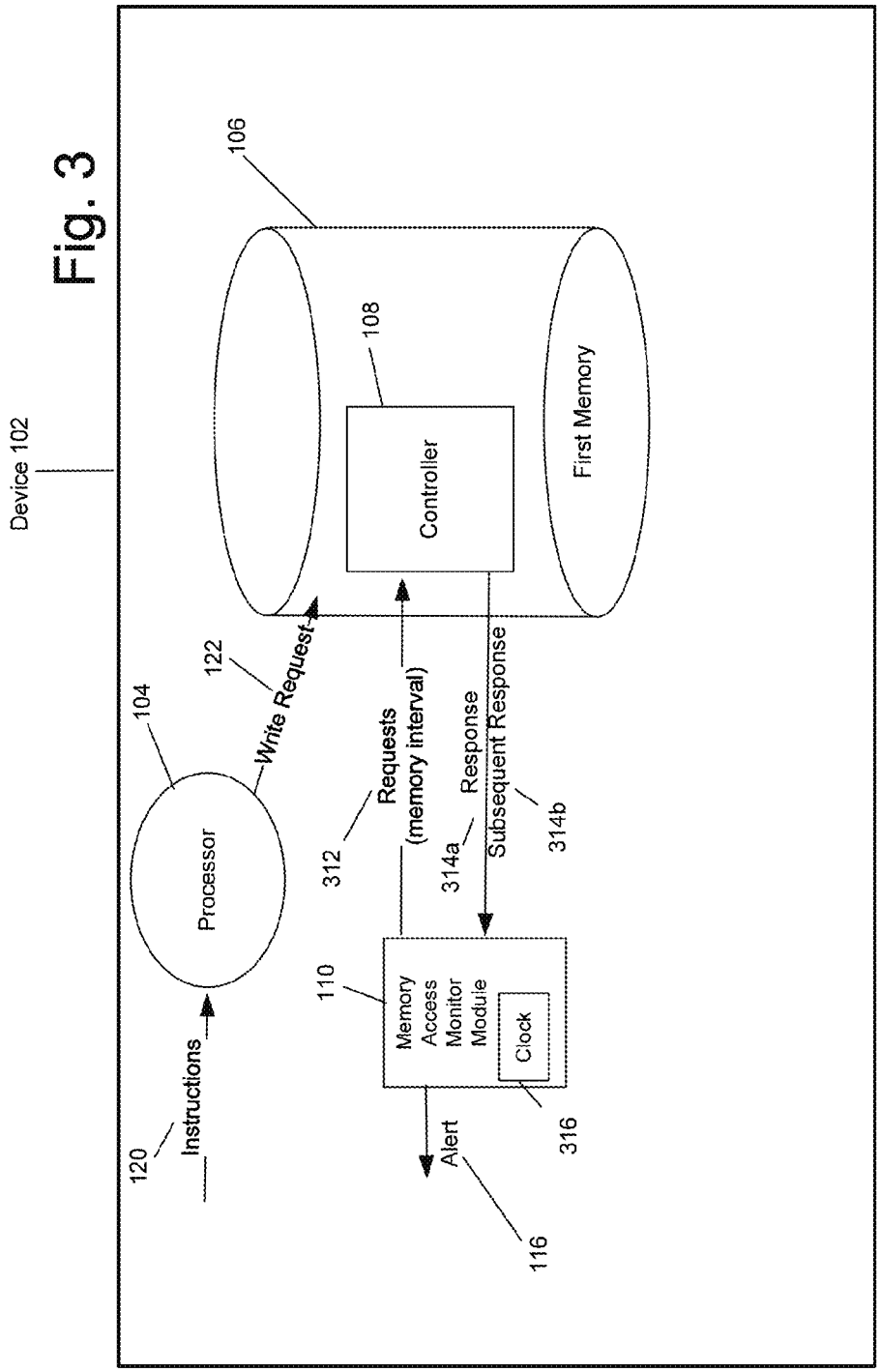
FIG. 3 illustrates the example system of FIG. 1 illustrating additional details relating to requests sent to determine an amount of data written in a time interval.

FIG. 3 illustrates example system 100 illustrating additional details relating to requests sent to determine an amount of data written in a time interval, arranged in accordance with at least some embodiments described herein. System 100 depicted in FIG. 3 is substantially similar to system 100 of FIG. 1 with additional details. Those components in FIG. 3 that are labeled identically to components of FIG. 1 and FIG. 2 will not be described again for the purposes of clarity.

In another example, memory access monitor module 110 may identify a first time of a clock 316. Memory access monitor module 110 may send a request 312 to controller 108. Request 312 may be sent periodically, such as once every minute, to first memory 106. Request 312 may be a request to controller 108 for an amount of data written to first memory 106. Controller 108 may reply with one or more responses 314 (shown as 314a and 314b) identifying the amount of data written to first memory 106. In examples where the amount of data written is greater than or equal to a defined data threshold, memory access monitor module 110 may determine a second time of clock 316. Memory access monitor module 110 may then determine a time interval between the first time and the second time. If the time interval is less than a time threshold, memory access monitor module 110 may generate alert 116.

For example, at the first time of clock 316, response 314a may indicate that 2 GB of data have been written to first memory 106. At a subsequent time of the clock, a subsequent response 314b may indicate that 3 GB of data have been written to first memory 106. If 1 GB (3 GB−2 GB) corresponds to the defined data threshold, memory access monitor 110 may determine the second time. Memory access monitor 110 may then determine a time interval between the first time and the second time. If the time interval is less than the time threshold, memory access monitor module 110 may generate alert 116.

In an example, memory access monitor module 110 may be configured to send request 312 once each minute. In the example, memory access monitor module 110 may send an initial request at 2:31 PM (the first time of clock 316). Device 102 may have a defined data threshold of 1 GB. In response to request 312, controller 108 may send response 314a to memory access monitor module 110. Response 314a may indicate that 0.3 GB of data has been written to first memory 106. Memory access monitor module 110 may continue to send request 312 until response 314b indicates that the defined data threshold (1 GB in the current example) has been reached. When response 314b indicates that 1.0 GB of data has been written to first memory 106, clock 316 may indicate that the time is 3:17 PM (the second time of clock 316). Memory access monitor 110 may determine that the time interval is 46 minutes (3:17 PM−2:31 PM=0 hours, 46 minutes or 0.766 hours). Memory access monitor module 110 may compare this time interval of 46 minutes to the time threshold. In the example, the time threshold may be 1 hour. As the time difference value is less than the time threshold (46 minutes<1 hour), memory access monitor module 110 may generate alert 116. If the difference value exceeds the time threshold, device 102 may continue to operate as normal until the next request 312 is generated.

Figure 4:
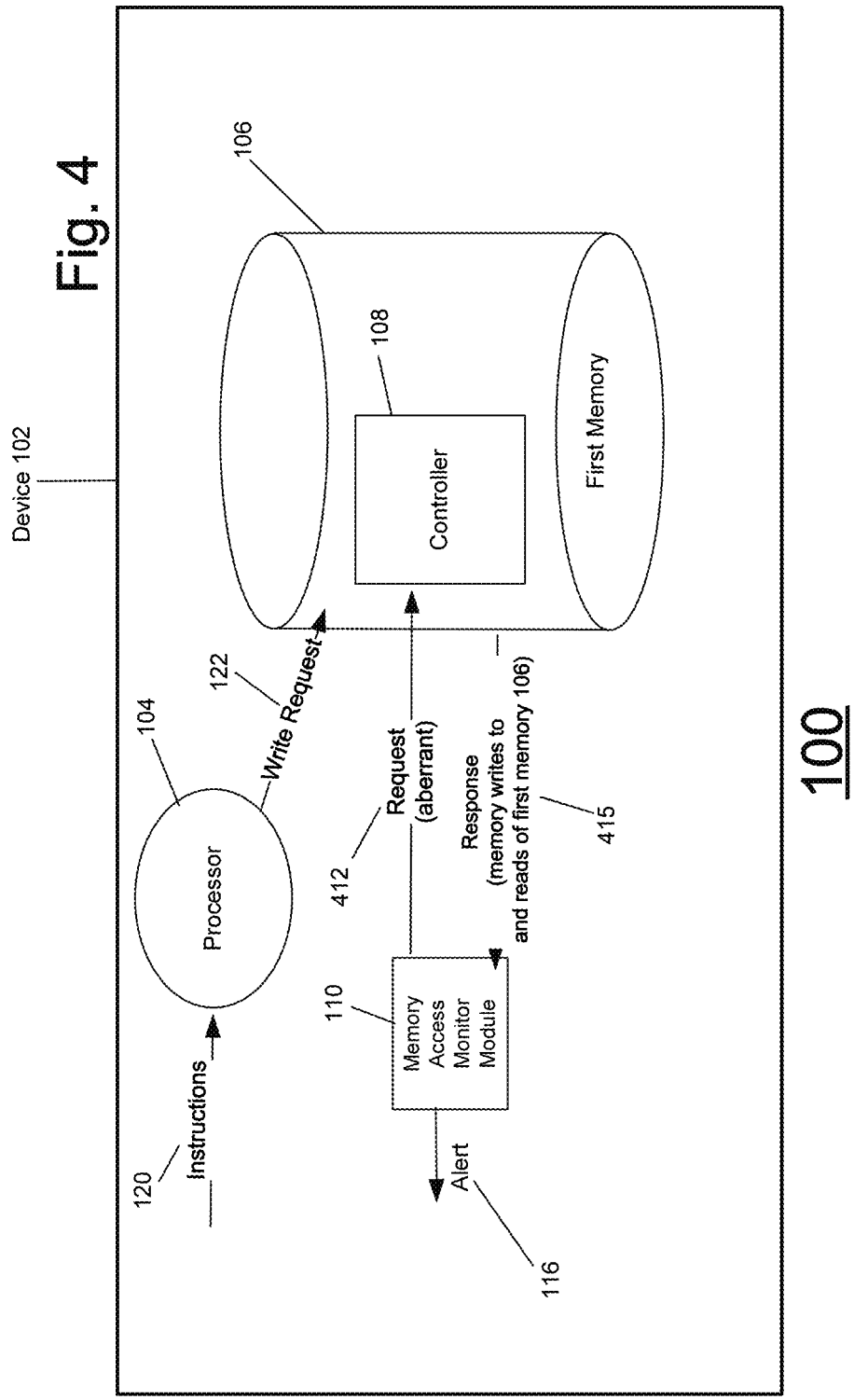
FIG. 4 illustrates the example system of FIG. 1 illustrating additional details relating to detecting potential aberrant activities.

FIG. 4 illustrates example system 100 illustrating additional details relating to detecting potential aberrant activities, arranged in accordance with at least some embodiments described herein. System 100 depicted in FIG. 4 is substantially similar to system 100 of FIG. 1 with additional details. Those components in FIG. 4 that are labeled identically to components of FIG. 1, FIG. 2, and FIG. 3 will not be described again for the purposes of clarity.

Memory access monitor module 110 may send a request 412 to controller 108. Request 412 may be a request for information regarding the number and memory writes to and reads of first memory 106. Controller 108 may send response 415 to memory access monitor module 110. Response 415 may be information related to the number and memory writes to and reads of first memory 106.

Based on response 415, memory access monitor module 110 may be configured to detect one or more potential aberrant activities performed on first memory 106. An aberrant activity may reflect a potential memory attack on first memory 106. An example of an aberrant activity may be an application writing continuously to a data block of first memory 106 without reading stored values of that data block in first memory 106. Another example of an aberrant activity may be an application that performs disproportionately more memory writes to than memory reads on data blocks of first memory 106. For example, aberrant activity may be detected when memory writes to a data block are 10 times greater than a number of reads of the data block. Another example of an aberrant activity may be a program continually writing "garbage data" to data blocks of first memory 106. Such garbage data may include data that is unreachable by a program or application being executed. Data may be unreachable where there are no pointers or references to the data. An aberrant activity may be detected when a threshold number of memory writes relates to locations in first memory 106 without pointers. If memory access monitor 110 detects one or more aberrant activities, memory access monitor 110 may generate alert 116.

Figure 5:
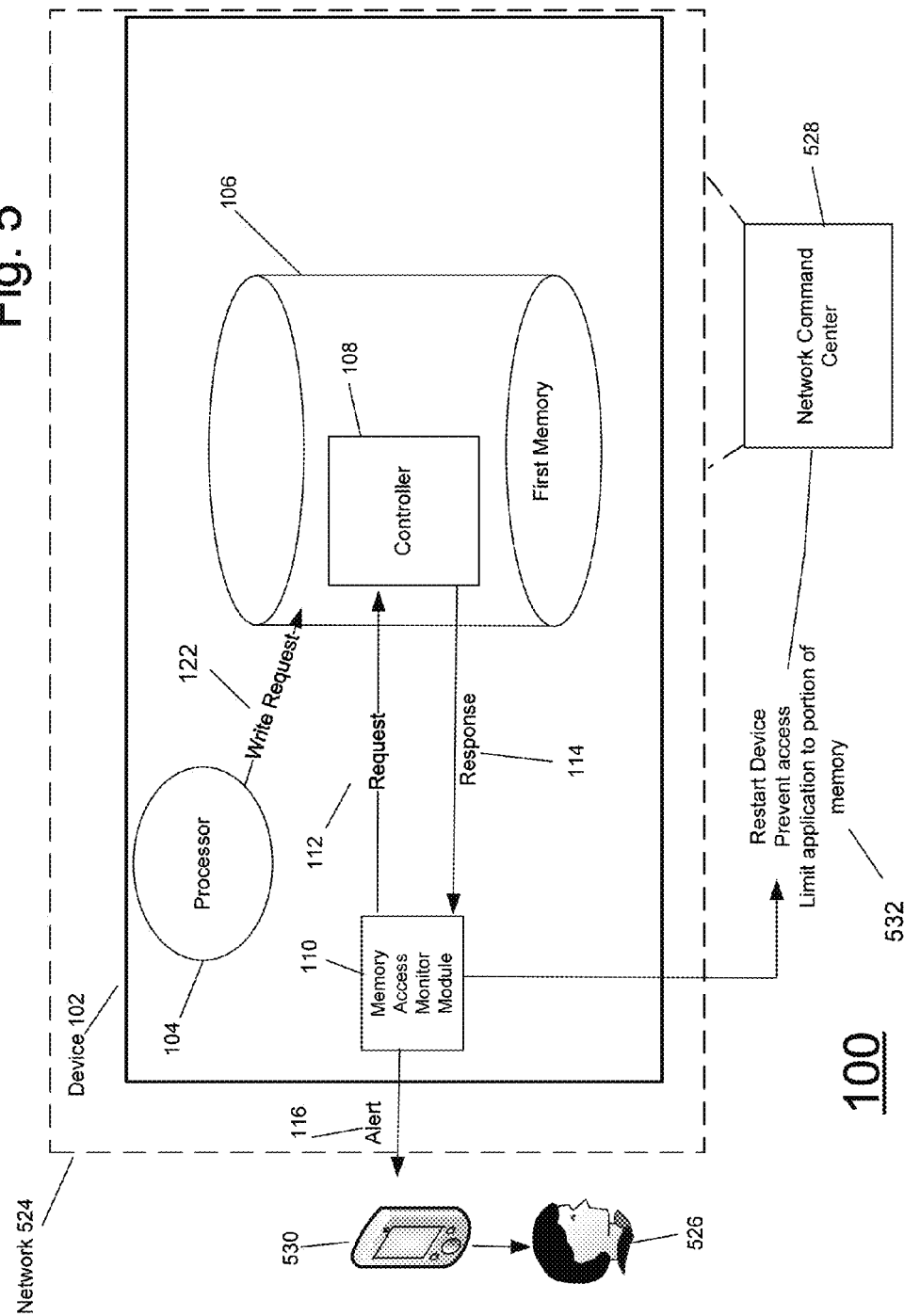
FIG. 5 illustrates the example system of FIG. 1 illustrating additional details relating to generating alerts.

FIG. 5 illustrates example system 100 illustrating additional details relating to generating alerts, arranged in accordance with at least some embodiments described herein. System 100 depicted in FIG. 5 is substantially similar to system 100 of FIG. 1 with additional details. Those components in FIG. 5 that are labeled identically to components of FIG. 1, FIG. 2, FIG. 3 and FIG. 4 will not be described again for the purposes of clarity.

As described above, memory access monitor 110 may generate alert 116 when a potential memory attack is detected. Alert 116 may be a warning that a potential memory attack is being performed on first memory 106. Alert 116 may include information related to a number and/or a type of actions performed on first memory 106. After alert 116 is generated, additional information may be collected by memory access monitor module 110. The additional information may include an identification of applications or threads being executed by processor 104, and a determination of which of these applications or threads is performing the potential memory attack. For example, memory access monitor 110 can determine which application accessed first memory 106 in a manner sufficient to cause generation of alert 116.

Alert 116 may be provided to a user 526 such as through a user interface 530. User 526 may be a user of device 102. User interface 530 may include a PDA, computing device, tablet or other device capable of providing alert 116 to user 526. Based on alert 116, user 526 may determine an appropriate action 532 to take with regard to device 102. Alert 116 may also include one or more actions 532 to be taken automatically by memory access monitor module 110. Actions 532 may include, for example, generating an instruction to restart device 102 and/or identifying one or more applications suspected of performing a memory attack on first memory 106. Memory access monitor module 110 may generate a signal effective to prevent one or more applications from accessing first memory 106. Another action may include generating a signal effective to limit an application to accessing a portion of first memory 106.

Alert 116 may be provided to a network 524. Network 524 may be a network of one or more devices configured to be in communication with device 102. Alert 116 may provide information to network 524 concerning a potential memory attack being performed on device 102. Network 524 may include a network command center 528. Network command center 528 may be a device configured to control other devices within network 524. Upon receiving alert 116, network command center 528 may determine one or more appropriate actions to take with respect to other devices within network 524.

Among other possible benefits, a system in accordance with the disclosure may detect and prevent potential attacks on memory, including flash memory. The system may monitor writes to and reads of memory. When a potential attack is detected, the system may take one or more actions to prevent the attack. Such actions may include identifying the attacking application and limiting the application's memory access to a defined set of memory addresses. The system may also alert a network command center or a user that a potential attack on memory is taking place. Memory attacks may, without this disclosure, be particularly problematic in examples where power is not provided by a battery and so a persistent memory attack may be otherwise unnoticed. Such prevention may, in turn, save time and money in replacing memory in systems that have suffered a memory attack. A system in accordance with the disclosure may be useful in scenarios where memory in a device may be otherwise difficult to access.

Figure 6:
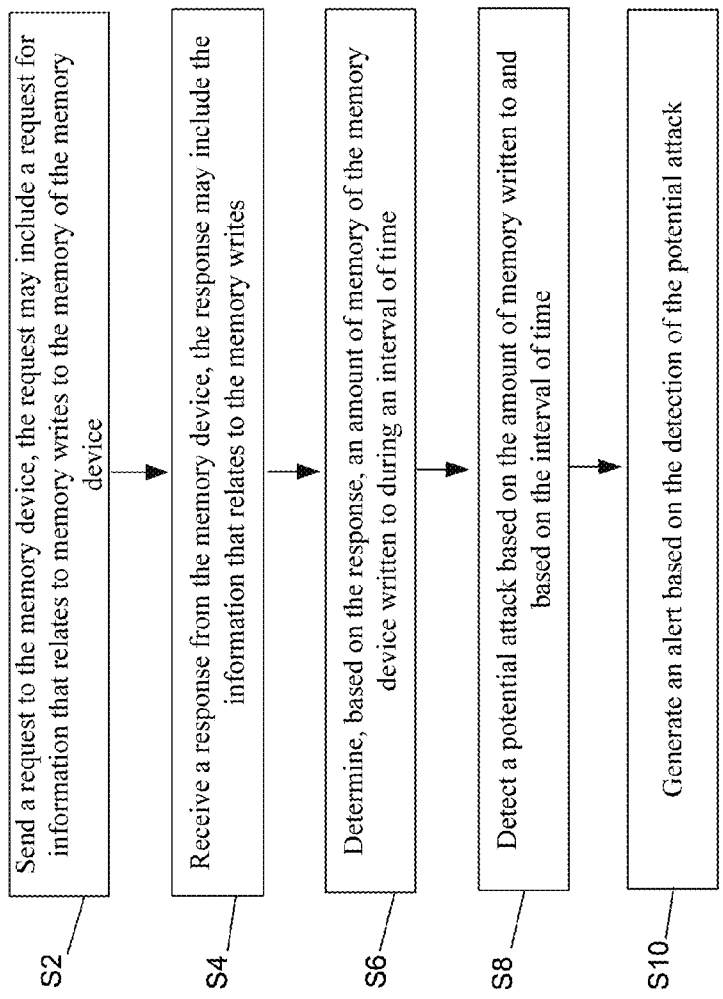
FIG. 6 depicts a flow diagram for an example process for implementing memory attack detection.

FIG. 6 depicts a flow diagram for example processes for implementing memory attack detection, arranged in accordance with at least some embodiments described herein. In some examples, the process in FIG. 6 could be implemented using system 100 discussed above and could be used to detect potential memory attacks. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation. The process in FIG. 6 may be used by a memory device that includes a memory and a memory controller. The process in FIG. 6 may also include a processor configured to be in communication with the memory.

Processing may begin at block S2, "Send a request to a memory device, the request may include a request for information that relates to memory writes to the memory of the memory device." At block S2, the processor may send a request to a memory device. The request may include a request for information that relates to memory writes to the memory of the memory device.

Processing may continue from block S2 to block S4, "Receive a response from the memory device, the response may include the information that relates to the memory writes." At block S4, a response may be received by the processor. The response may include information that relates to the memory writes.

Processing may continue from block S4 to block S6, "Determine, based on the response, an amount of memory of the memory device written to during an interval of time." At block S6, the processor may determine, based on the response, an amount of memory of the memory device written to during an interval of time. In an example, this determination may include determining a particular interval of time when a defined amount of memory of the memory device is written to, and comparing the particular interval to a threshold. In an example of such a threshold, the threshold may be based on an application accessing the memory device. In another example, the determination may include determining a particular amount of memory written to when a defined interval of time has passed, and comparing the particular amount of memory to a threshold. In an example of such a threshold, the threshold may be based on an application accessing the memory device.

Processing may continue from block S6 to block S8, "Detect a potential attack based on the amount of memory written to and based on the interval of time." At block S8, the processor may detect a potential attack based on the amount of memory written to and based on the interval of time.

Processing may continue from block S8 to block S10, "Generate an alert based on the detection of the potential attack." At block S10, the processor may generate an alert based on the detection of the potential attack. In an example, generating the alert may include generating a warning on a user interface. In another example, generating the alert may further include identifying an application corresponding to the memory writes and generating a signal effective to prevent the application from accessing the memory of the memory device. In another example, generating the alert may include generating a signal effective to limit an identified application corresponding to the memory writes to a portion of the memory of the memory device. In another example, generating the alert may further include generating an instruction to restart a device that includes the memory device.

Figure 7:
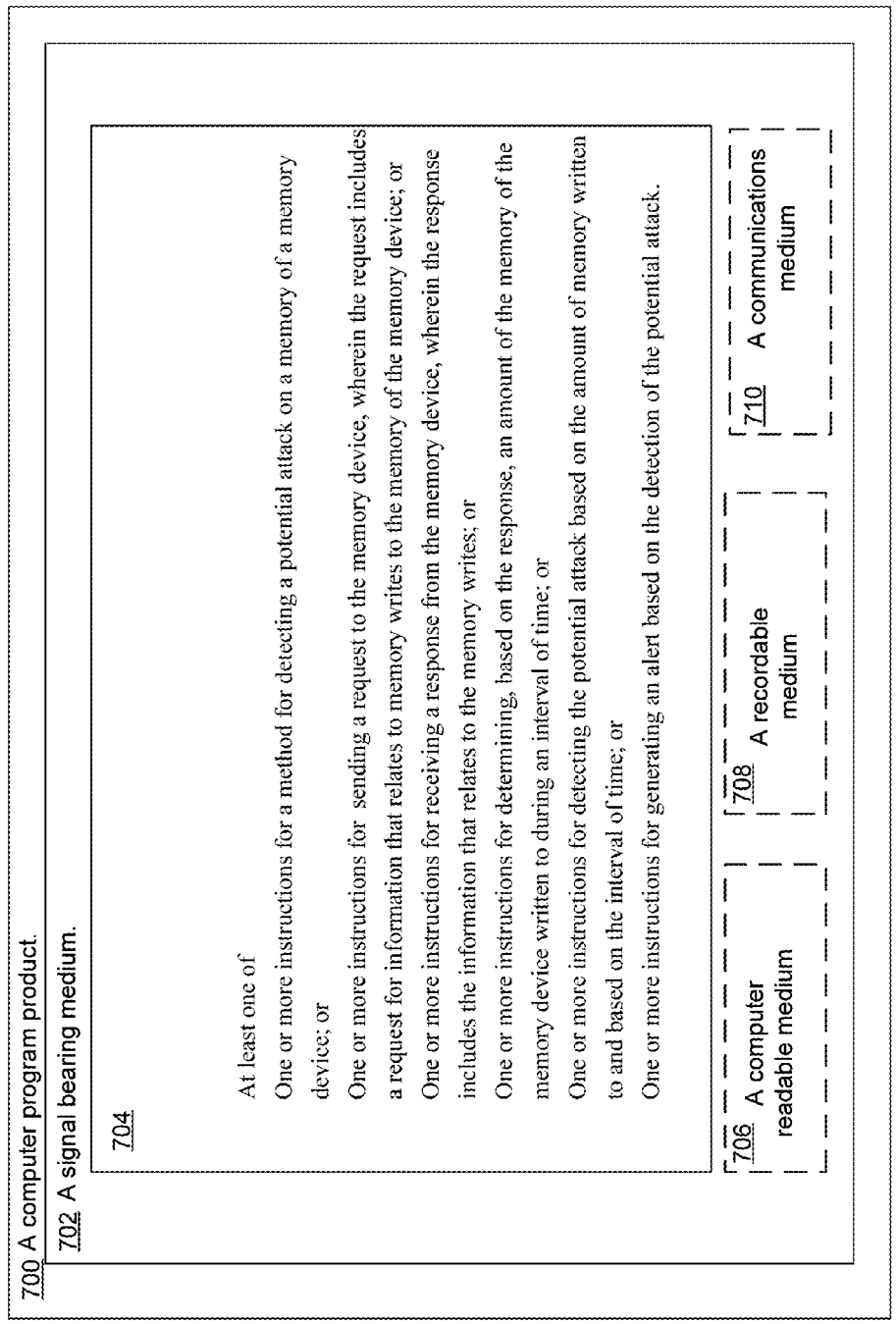
FIG. 7 illustrates a computer program product that can be utilized to implement memory attack detection.

FIG. 7 illustrates an example computer program product 700 that can be utilized to implement memory attack detection, arranged in accordance with at least some embodiments described herein. Program product 700 may include a signal bearing medium 702. Signal bearing medium 702 may include one or more instructions 704 that, when executed by, for example, a processor, may provide the functionality described above with respect to FIGS. 1-6. Thus, for example, referring to system 100, processor 104 may undertake one or more of the blocks shown in FIG. 7 in response to instructions 304 conveyed to the system 100 by medium 702.

In some implementations, signal bearing medium 702 may encompass a computer-readable medium 306, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

Figure 8:
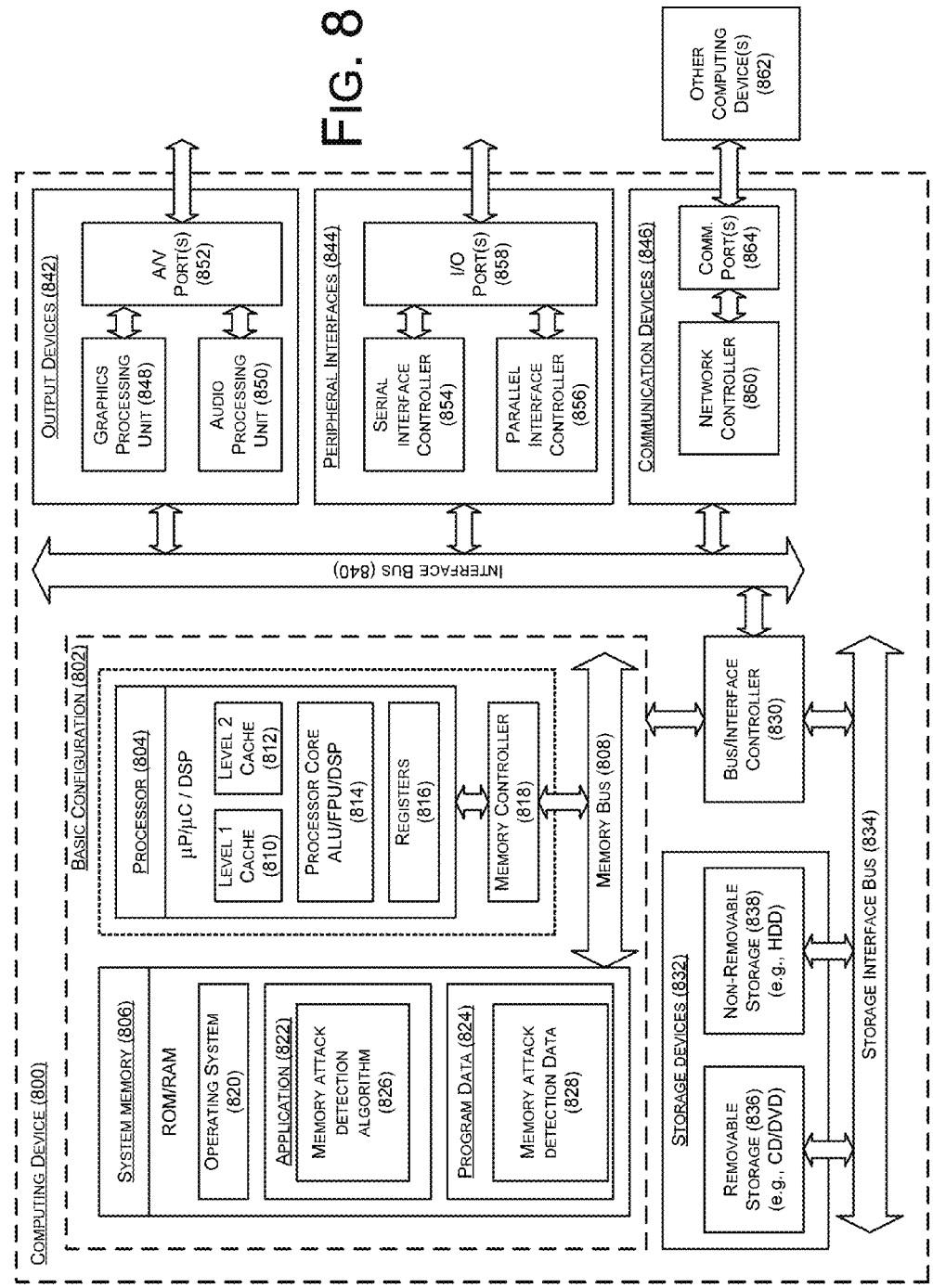
FIG. 8 is a block diagram illustrating an example computing device that is arranged to implement memory attack detection.

FIG. 8 is a block diagram illustrating an example computing device 800 that is arranged to implement memory attack detection, arranged in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a memory attack detection algorithm 826 that is arranged to perform the functions as described herein including those described with respect to system 100 of FIGS. 1-7. Program data 824 may include memory attack detection data 828 that may be useful to implement memory attack detection as is described herein. In some embodiments, application 822 may be arranged to operate with program data 824 on operating system 820 such that memory attack detection may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 448 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to detect a potential attack on a memory of a memory device, the method comprising, by a hardware processor:
    sending a request to the memory device, wherein the request includes a request for information that relates to memory writes to the memory of the memory device;
    receiving a response from the memory device, wherein the response includes the information that relates to the memory writes;
    determining, based on the response, an amount of the memory of the memory device written to during an interval of time;
    detecting the potential attack on the memory by:
        assigning a data threshold and a time threshold to each application of a plurality of applications executing on the memory device, wherein the data threshold and the time threshold are different for the plurality of applications;
        comparing, for a particular application of the plurality of applications, the amount of the memory of the memory device written to during the interval of time with the data threshold assigned to the particular application; and
        in response to the amount of the memory being written to equaling or exceeding the data threshold assigned to the particular application, comparing the interval of time with the time threshold assigned to the particular application to detect the potential attack when the interval of time exceeds the time threshold assigned to the particular application, wherein the potential attack on the memory includes a potential attack on a data block of the memory, and wherein the potential attack, if successful, would disable the data block to no longer store information;
    generating an alert based on the detection of the potential attack; and
    preventing, based on the generation of the alert, the particular application from accessing the memory of the memory device.

2. The method of claim 1, wherein generating the alert includes generating a warning on a user interface.

3. The method of claim 1, further comprising identifying an application, from the plurality of applications, which corresponds to the memory writes.

4. The method of claim 1, further comprising:
identifying an application, from the plurality of applications, which corresponds to the memory writes; and
generating a signal effective to prevent the identified application from accessing the memory of the memory device.

5. The method of claim 1, further comprising:
identifying an application, from the plurality of applications, which corresponds to the memory writes; and
generating a signal effective to prevent the identified application from accessing a portion of the memory of the memory device.

6. The method of claim 1, wherein generating the alert includes generating an instruction to restart a device that includes the memory device.

7. The method of claim 1, wherein determining the amount of the memory of the memory device written to during the interval of time includes:
determining a particular interval of time when a defined amount of the memory of the memory device is written to; and
comparing the particular interval of time to the time threshold for each application of the plurality of applications.

8. The method of claim 7, wherein the time threshold is based on an application, of the plurality of applications, accessing the memory of the memory device.

9. The method of claim 1, wherein determining the amount of the memory of the memory device written to during the interval of time includes:
determining a particular amount of the memory of the memory device written to when a defined interval of time has passed; and
comparing the particular amount of the memory of the memory device to the data threshold of each application of the plurality of applications.

10. The method of claim 9, wherein the data threshold is based on an application, of the plurality of applications, accessing the memory of the memory device.

11. A device, comprising:
a memory device that includes a memory and a memory controller; and
a hardware processor configured to be in communication with the memory device,
wherein the hardware processor is configured to:
send a request to the memory device, wherein the request includes a request for information that relates to memory writes to the memory of the memory device;
receive a response from the memory device, wherein the response includes the information that relates to the memory writes;
determine, based on the response, an amount of the memory of the memory device written to during an interval of time;
detect a potential attack on the memory by:
assigning a data threshold and a time threshold to each application of a plurality of applications, which executes on the memory device, wherein the data threshold and the time threshold are different for the plurality of applications;
comparing, for a particular application of the plurality of applications, the amount of the memory of the memory device written to during the interval of time with the data threshold assigned to the particular application; and
in response to a determination that the amount of the memory of the memory device being written to equaling or exceeding the data threshold assigned to the particular application, comparing the interval of time with the time threshold assigned to the particular application to detect the potential attack when the interval of time exceeds the time threshold assigned to the particular application, wherein the potential attack on the memory includes a potential attack on a data block of the memory, and wherein the potential attack, if successful, would disable the data block to no longer store information;
generate an alert based on the detection of the potential attack; and
prevent, based on the generation of the alert, the particular application, from accessing the memory of the memory device.

12. The device of claim 11, wherein the hardware processor is further configured to:
identify an application, from the plurality of applications, which corresponds to the memory writes; and
generate a signal effective to prevent the identified application from accessing the memory of the memory device.

13. The device of claim 11, wherein the hardware processor is further configured to:
identify an application, from the plurality of applications, which corresponds to the memory writes; and
generate a signal effective to prevent the identified application from accessing a portion of the memory of the memory device.

14. The device of claim 11, wherein the hardware processor is configured to determine the amount of the memory of the memory device written to during the interval of time by:
determination of a particular interval of time when a defined amount of the memory of the memory device is written to; and
comparison of the particular interval of time to the time threshold of each application of the plurality of applications.

15. The device of claim 14, wherein the time threshold is based on an application, of the plurality of applications, that accesses the memory of the memory device.

16. The device of claim 11, wherein the hardware processor is configured to determine the amount of the memory of the memory device written to during the interval of time by:
determination of a particular amount of the memory of the memory device written to, when a defined interval of time has passed; and
comparison of the particular amount of the memory of the memory device to the data threshold of each application of the plurality of applications.

17. The device of claim 11, wherein the hardware processor is a part of the memory controller.

18. A method to detect a potential attack on a memory of a memory device, the method comprising, by a hardware processor:
sending a request to the memory device, wherein the request includes a request for information relating to successful memory writes to the memory of the memory device and successful reads of the memory of the memory device;

receiving a response from the memory device, wherein the response includes the information that relates to the successful memory writes and the successful memory reads;

detecting, based on the response, the potential attack on the memory by:

assigning a data threshold and a time threshold to each application of a plurality of applications executing on the memory device, wherein the data threshold and the time threshold are different for the plurality of applications;

comparing, for a particular application of the plurality of applications, a number of the successful memory reads and the successful memory writes during an interval of time with the data threshold assigned to the particular application; and in response to the number of the successful memory reads and the successful memory writes being equal to or exceeding the data threshold assigned to the particular application, comparing the interval of time with the time threshold assigned to the particular application to detect the potential attack when the interval of time exceeds the time threshold assigned to the particular application, wherein at least one of a number of the successful memory reads and a number of the successful memory writes is two or more;

generating an alert based on the detection of the potential attack; and preventing, based on the generation of the alert, the particular application from accessing the memory of the memory device.

19. The method of claim 18, wherein the memory includes first locations in the memory and second locations in the memory, wherein a presence of pointers in the first locations indicates that data residing at the first locations is accessible and a lack of pointers in the second locations indicates that data residing at the second locations is not accessible, and wherein detecting the potential attack includes determining that a threshold number of the successful memory writes relates to the second locations in the memory of the memory device.

20. The method of claim 18, wherein detecting the potential attack includes determining that the number of the successful memory reads is disproportionate to the number of the successful memory writes.

* * * * *